(12) United States Patent
Van Blokland

(10) Patent No.: US 11,333,543 B2
(45) Date of Patent: May 17, 2022

(54) BELT CONVEYOR WITH A WEIGHING DEVICE FOR A DOUGH LINE

(71) Applicant: Radie B.V., BC Culemborg (NL)

(72) Inventor: Johannes Josephus Antonius Van Blokland, BG Laren (NL)

(73) Assignee: RADIE B.V.

( * ) Notice: Subject to any disclaimer, the term of this patent is extended or adjusted under 35 U.S.C. 154(b) by 504 days.

(21) Appl. No.: 16/522,222

(22) Filed: Jul. 25, 2019

(65) Prior Publication Data

US 2020/0049548 A1 Feb. 13, 2020

(30) Foreign Application Priority Data

Jul. 26, 2018 (EP) .................................... 18185796

(51) Int. Cl.
*G01G 11/04* (2006.01)
*B65G 21/20* (2006.01)

(52) U.S. Cl.
CPC .............. *G01G 11/04* (2013.01); *B65G 21/20* (2013.01); *B65G 2201/0202* (2013.01); *B65G 2812/02019* (2013.01)

(58) Field of Classification Search
CPC ...... G01G 11/04; G01G 11/003; B65G 21/20; B65G 2201/0202; B65G 2812/02019; B65G 2203/0258; B65G 2207/30
See application file for complete search history.

(56) References Cited

U.S. PATENT DOCUMENTS

| | | | | |
|---|---|---|---|---|
| 5,304,745 A * | 4/1994 | Rusk | .......................... | B07C 5/16 |
| | | | | 177/128 |
| 5,686,653 A * | 11/1997 | Homer, III | ........... | G01G 11/006 |
| | | | | 177/50 |
| 8,985,316 B2 * | 3/2015 | Mihai | .................... | B65G 23/18 |
| | | | | 198/805 |
| 9,146,146 B2 * | 9/2015 | Laird | ..................... | G01G 19/00 |
| 11,167,941 B2 * | 11/2021 | Byrne | .................... | G01G 19/52 |

(Continued)

FOREIGN PATENT DOCUMENTS

| | | |
|---|---|---|
| EP | 0718218 A2 | 6/1996 |
| EP | 2846140 A1 | 3/2015 |

(Continued)

OTHER PUBLICATIONS

Communication and European Search Report dated Jan. 23, 2019, from European Application No. 18185796.2, 9 sheets.

*Primary Examiner* — Mark A Deuble
(74) *Attorney, Agent, or Firm* — Katten Muchin Rosenman LLP

(57) ABSTRACT

The present invention relates to a belt conveyor with a weighing device for a dough line, comprising a conveyor device, comprising a frame, at least two rollers supported by the frame, a conveyor belt, arranged movable in a length direction of the belt around the at least two rollers and a slot, extending in a width direction of the conveyor belt, and arranged adjacent to an inwardly facing part of the conveyor belt, and a weighing device, comprising a housing fitting the slot; and being movable into and removable from the slot at least one weighing unit, carried by the housing and arranged with a weighing surface thereof facing outwardly for weighing a weight exercised on the weighing surface.

17 Claims, 3 Drawing Sheets

(56) References Cited

U.S. PATENT DOCUMENTS

| | | | |
|---|---|---|---|
| 2007/0187211 A1* | 8/2007 | Vertogen | B65G 47/31 |
| | | | 198/461.1 |
| 2008/0035390 A1* | 2/2008 | Wurz | G01G 19/4148 |
| | | | 177/25.15 |
| 2014/0034448 A1* | 2/2014 | van Blokland | G01G 11/04 |
| | | | 198/341.04 |

FOREIGN PATENT DOCUMENTS

| | | |
|---|---|---|
| WO | 99/36753 A1 | 7/1999 |
| WO | 2014/035576 A1 | 3/2014 |

\* cited by examiner

BELT CONVEYOR WITH A WEIGHING DEVICE FOR A DOUGH LINE

RELATED APPLICATIONS

This application claims priority of European Patent Application No. 18185796, entitled "BELT CONVEYOR WITH A WEIGHING DEVICE FOR A DOUGH LINE," filed on Jul. 26, 2018 in the European Patent Office, and herein incorporated by reference in its entirety.

TECHNICAL FIELD

The present invention relates to a belt conveyor with a weighing device for a dough line.

BACKGROUND

It is common practice to incorporate weighing devices in dough lines. One known solution in the art is to place a weighing section in between two conveyor belt sections. Another solution is to have weighing equipment under the conveyor belt and to weigh "through" the belt. For both cases, several solutions exist. It is known to have a roller, which can be placed in between conveyor belt sections or under the conveyor belt and it is also known to have a weighing table, for which also solutions exist wherein the weighing section is placed under the conveyor belt.

When applied in an industrial environment, dough lines may be used for manufacturing several products, and changes to their configuration may be required when changing from one product to another. In this view, weighing sections are rather complex and sensitive elements in dough lines, and it may be both expensive and cumbersome to change their position.

One example is given in the European Patent EP 2846140 by the same applicant, disclosing a weighing device with a weighing section that is bolted to the conveyor frame, requiring the conveyor belt to be removed to enable access to the bolts for removing the weighing device, which is time consuming and cumbersome in practice.

In other cases, the position may not necessarily be altered, but a weighing operation with different settings needs to take place at the same location. This may have the same effect of requiring the replacement of the weighing section by another type. It is a goal of the present invention to take away the above mentioned disadvantages of the prior art and/or to provide a useful alternative.

SUMMARY

Advantages of embodiments described herein may be provided, for example, by a belt conveyor for a dough line that includes a conveyor device and a weighing device. The conveyor device includes a frame, at least two rollers supported by the frame, a conveyor belt arranged movable in a length direction of the belt around the at least two rollers, and at least one slot provided in the frame. The at least one slot extends in a width direction of the conveyor belt and is arranged adjacent to an inwardly facing part of the conveyor belt. The weighing device includes at least one housing fitting the at least one slot and at least one weighing unit carried by the housing. The at least one housing is slidably movable into and removable from the slot. The at least one weighing unit includes a weighing surface facing outwardly for weighing a weight exercised on the weighing surface.

The weighing device may have an operation position with respect to the at least one slot, in which the at least one housing of the weighing device is positioned in the at least one slot and the weighing surface of the at least one weighing unit is positioned against the inwardly facing part of the conveyor belt. The at least one slot may include a guidance for the weighing device, and the weighing device may include at least one wheel for engaging the guidance when the housing is placed in or removed from the at least one slot. The guidance may include an interruption or recess, which is positioned such that the at least one wheel of the weighing device is free from the guidance when the weighing device is in an operation position with respect to the slot. In the operation position, the at least one weighing unit may be supported at three support locations. The weighing device may include three supports for engaging the conveyor device in an operation position. The conveyor device may further include a sliding shoe for deviating the conveyor belt and a foldable nose bar to enable moving the at least one housing into and out of the at least one slot. The conveyor device may further include interfaces for power and data transfer which are mutually connectable to a control device. The weighing device may include at least one roller. The weighing device may include a weighing matrix.

These and other advantages may also be provided, for example, by a conveyor device for a belt conveyor for a dough line. The belt conveyor may include a weighing device. The conveyor device includes a frame, at least two rollers supported by the frame, a conveyor belt arranged movable in a length direction of the belt around the at least two rollers, and a slot provided in the frame. The slot extends in a width direction of the conveyor belt and is arranged adjacent to an inwardly facing part of the conveyor belt. The slot slidably receives the weighing device.

The slot may include a guidance for the weighing device. A wheel of the weighing device may engage the guidance when the weighing device is slidably placed in or removed from the slot. The guidance may include an interruption or recess, which is positioned such that the wheel of the weighing device is free from the guidance when the weighing device is in an operation position with respect to the slot. Alternatively, the slot may include a wheel to guide the weighing device. The wheel of the slot may engage a guidance of the weighing device when the slot slidably receives the weighing device. The conveyor device may further include a sliding shoe for deviating the conveyor belt and a foldable nose bar to enable moving the at least one weighing unit into and out of the at least one slot. The conveyor device may further include interfaces for power and data transfer which are mutually connectable to a control device.

These and other advantages may also be provided, for example, by a weighing device for a belt conveyor for a dough line. The belt conveyor may include a conveyor device. The weighing device includes a housing fitting a slot provided in a fame of the conveyor device, at least one weighing unit carried by the housing, a wheel for engaging a guidance provided in the slot while the housing is slidably placed in or removed from the slot, and three supports for engaging the conveyor device in an operation position to weigh doughs. The housing may be slidably movable into and removable from the slot. The at least one weighing unit may include a weighing surface facing outwardly for weighing a weight exercised on the weighing surface.

BRIEF DESCRIPTION OF THE DRAWINGS

The drawing figures depict one or more implementations in accord with the present concepts, by way of example only.

DETAILED DESCRIPTIONS

Figure 1:
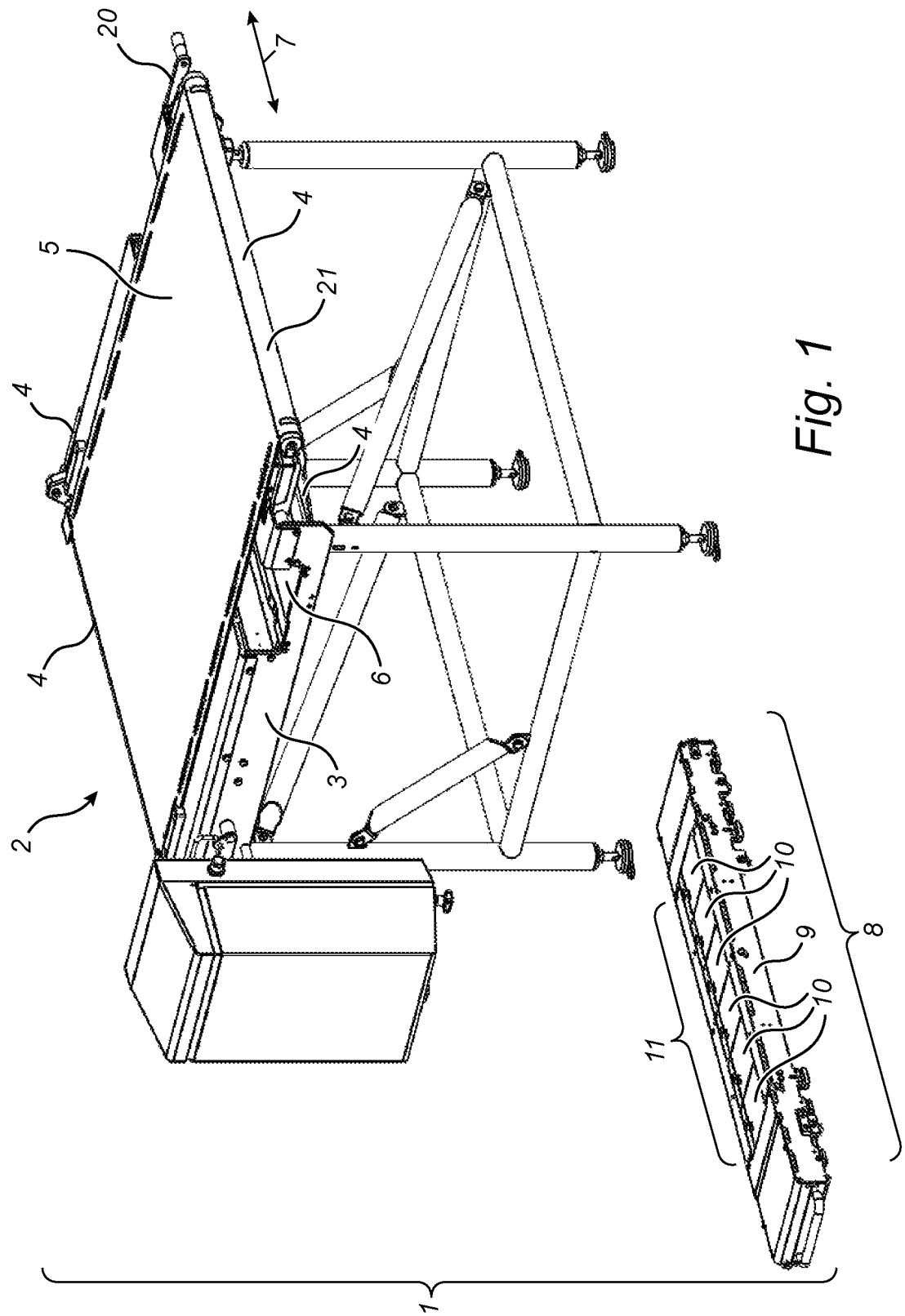
FIG. 1 shows an overview of a belt conveyor according to the present invention, comprising a conveyor device and a weighing device.

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention thereto provides a belt conveyor with an exchangeable weighing device for a dough line, comprising a conveyor device, the conveyor device comprising a frame, at least two rollers supported by the frame, a conveyor belt, arranged movable in a length direction of the belt around the at least two rollers, at least one slot, extending in a width direction of the conveyor belt, and arranged adjacent to an inwardly facing part of the conveyor belt; and at least one weighing device, comprising a housing fitting the slot and being movable into and removable from the slot and at least one weighing unit, carried by the housing and arranged with a weighing surface thereof facing outwardly for weighing a weight exercised on the weighing surface. Exchangeable in the sense of the present invention means in particular that it is not required to remove or loosen the conveyor belt for taking out the weighing.

The belt conveyor according to the invention enables to easily remove a weighing device placed at a certain location in a dough line. The weighing device can be taken out for maintenance purposes, such as cleaning, or in order to be exchanged with another weighing device. This may be required when the dough line is to be used for a different set up, for instance when dough products in a different amount of lanes are to be weighed, or when a different measurement range is required.

The weighing device may also be removed in order to be temporarily replaced by a dummy device, when weighing is no longer required at the specific location, and/or when the weighing device needs to be placed at a different location in the dough line. Evidently, at that different location a conveyor device may comprise a slot too. One conveyor device may comprise multiple slots, in order to facilitate moving weighing devices into multiple locations at the conveyor device. The housing may for instance have the form of a slide or a cassette.

In an embodiment, the weighing device has an operation position with respect to the slot, in which operation position the housing of the weighing device is positioned in the slot and the weighing surface of the weighing unit is positioned just against the inwardly facing part of the conveyor belt. The weighing unit is then positioned such that the belt can move along without being biased against the weighing device, and without a space in between the belt and the weighing device. This way, precise measurements can be made, without errors induced by the tension or distance of the belt with respect to the weighing device.

In a further embodiment, the slot comprises a guidance for the weighing device and the weighing device comprises at least one wheel for engaging the guidance when being placed into or being removed from the slot. Such guidance not only allows quick exchanges of the weighing device, but also ensures that the weighing device is moved into the slot or removed from the slot correctly and easily and reduces the risk of damages without damages made. The guidance may for instance comprise a rail that is engaged by wheels mounted on the housing of the weighing device.

In yet another embodiment, the guidance comprises an interruption or recess, which is positioned such that a wheel provided on the housing of the weighing device is free from the guidance when the weighing device is in its operation position with respect to the slot.

Evidently, the disclosed invention includes an embodiment of a mechanic reversal, wherein the slot is provided with a wheel, and the weighing device comprises a guidance for engaging the wheel of the slot and a recess formed on the guidance to accommodate the wheel of the slot when the weighing device is in the operation position. In this embodiment, the wheel of the slot is free from the guidance of the weighing device when the weighing device is in its operation position with respect to the slot.

The operation position requires an exact, precise and stable position of the weighing device. While the wheels provide the advantage of a quick and easy placement of the device, and offer freedom to move, at the operation position an exact positioning is required. For that reason, in an embodiment, the weighing unit may be supported at exactly three support locations. An amount of three supports ensures a stable support, since three points are always in the same plane. For engaging the three points of the conveyor device, the weighing device may comprise three supports for engaging the conveyor device in the operating position. Of these three supports, at least one, but preferably all may have adjustable positions with respect to the housing, in order to adjust the positioning of the weighing device. This may be a setting that needs adjustment one time, and after that, be fixed in a position. The supports may be formed like a foot and engage a nock on the conveyor device.

In a further embodiment, the conveyor device comprises a sliding shoe for deviating the conveyor belt and a foldable nose bar in order to enable moving the weighing unit into and out of the slot. This ensures that the conveyor belt does not obstruct the placement or removal of a weighing device.

The conveyor device and the weighing device may comprise mutually connectable interfaces for power and data transfer, in particular formed by an electric connector and contra-connector. These may be at least partly wired or at least partly wireless connectors and the connection may be accomplished by moving a weighing device to its operation position, or may need manual intervention of an operator.

The weighing device may be of a type that comprises at least one roller, brought in contact with the inwardly facing side of a conveyor belt; that is the side not facing the dough product in use. The weighing device may also be of a kind comprising more sophisticated weighing matrices, which may be electronic devices, which may in certain embodiments be configurable over their width, and able to perform independent measurements in various configurable tracks.

The invention will now be elucidated into more detail, with reference to the figures. FIG. 1 shows an overview of a belt conveyor 1 according to the present invention. The belt conveyor 1 comprises a conveyor device 2 having a frame 3 with in the case shown 4 rollers 4 supported by the frame 3 and a conveyor belt 5, arranged movable in a length direction of the belt around the at least two rollers. The conveyor device comprises a slot 6, provided in the frame, and extending in a width direction of the conveyor belt 7, and arranged adjacent to an inwardly facing part of the conveyor belt 5. The invention further comprises a weighing device 8, comprising a housing 9 fitting the slot 6 and being movable into and removable from the slot 6, wherein the weighing device 8 comprises at least one weighing unit 10, carried by the housing 9 and arranged with a weighing surface 11 thereof facing outwardly for weighing a weight exercised on the weighing surface 11.

Figure 2:
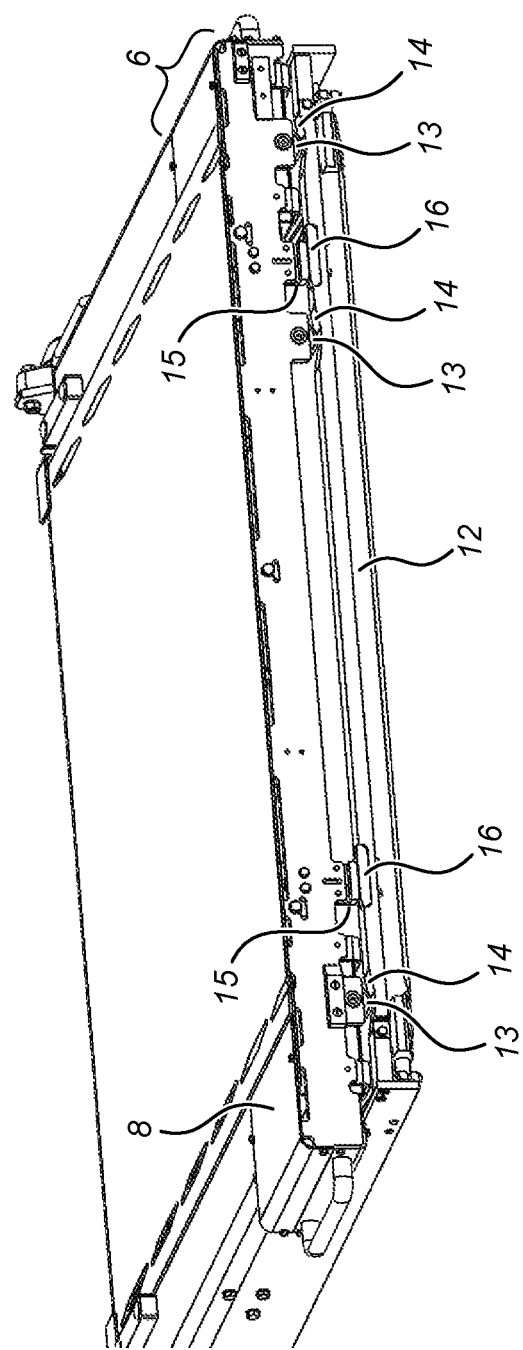
FIG. 2 shows a detail of the belt conveyor according to the invention.
Figure 3:
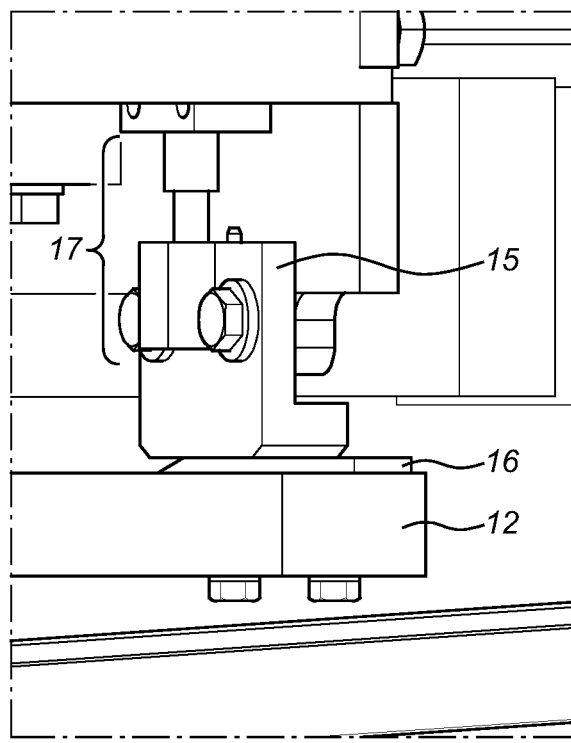
FIG. 3 shows an adjustable support.

FIG. 2 shows a detail of the belt conveyor 1 according to the invention, wherein the weighing device 8 is positioned in an operation position with respect to the slot 6, in which operation position the weighing surface of the weighing unit is positioned just against the inwardly facing part of the conveyor belt (not visible). The slot 6 comprises a guidance 12 for the weighing device 8 which comprises itself at least one wheel 13 for engaging the guidance 12 when being placed in or being removed from the slot 6. The guidance 12 is formed by a rail, which comprises a recess 14, which is positioned such that the wheel 13 is free from the guidance 12 when the weighing device 8 is in its operation position with respect to the slot 6. FIG. 3 shows a support 15 of the weighing device for engaging a nock 16 of the conveyor device 2 in the operating position. The support 15 may be provided with height adjustment means 17 for adjusting its height and being able to level the weighing device.

Figure 4:
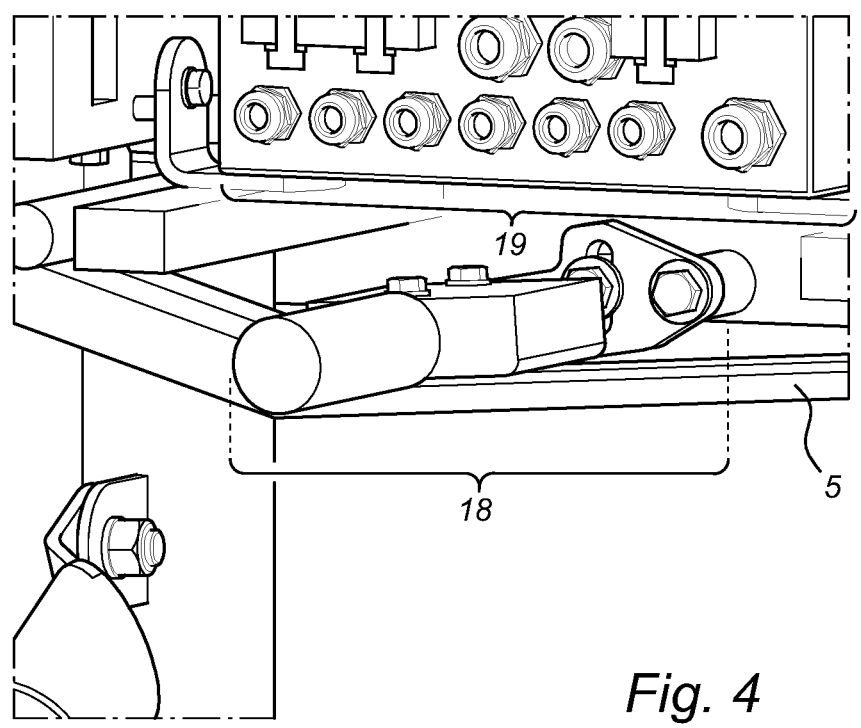
FIG. 4 shows a sliding shoe.

FIG. 4 shows another detail of the belt conveyor device according to the invention, comprising a sliding shoe 18 for deviating the conveyor belt 5 in order to enable moving the weighing unit into and out of the slot. Also visible in this figure is an interface 19 for power and data transfer, formed by electric connectors and contra-connectors. The sliding shoe works together with a foldable nose bar 21, which is visible in FIG. 1 and movable with the aid of handle 20.

The examples given are examples only and do in no sense limit the scope of protection of the present invention as defined by the following claims. The terms and descriptions used herein are set forth by way of illustration only and are not meant as limitations. Those skilled in the art will recognize that many variations are possible within the spirit and scope of the invention and the embodiments described herein.

What is claimed is:

1. A belt conveyor for a dough line, comprising:
a conveyor device, comprising:
a frame;
at least two rollers supported by the frame;
a conveyor belt arranged movable in a length direction of the belt around the at least two rollers; and
at least one slot provided in the frame, wherein the at least one slot extends in a width direction of the conveyor belt, and is arranged adjacent to an inwardly facing part of the conveyor belt; and
a weighing device, comprising:
at least one housing fitting the at least one slot, wherein the at least one housing is slidably movable into and removable from the slot; and
at least one weighing unit carried by the housing, wherein the at least one weighing unit includes a weighing surface facing outwardly for weighing a weight exercised on the weighing surface.

2. The belt conveyor according to claim 1 wherein the weighing device has an operation position with respect to the at least one slot, in which the at least one housing of the weighing device is positioned in the at least one slot and the weighing surface of the at least one weighing unit is positioned against the inwardly facing part of the conveyor belt.

3. The belt conveyor according to claim 1 wherein the at least one slot comprises a guidance for the weighing device, and the weighing device comprises at least one wheel for engaging the guidance when the housing is placed in or removed from the at least one slot.

4. The belt conveyor according to claim 3 wherein the guidance comprises an interruption or recess, which is positioned such that the at least one wheel of the weighing device is free from the guidance when the weighing device is in an operation position with respect to the slot.

5. The belt conveyor according to claim 2 wherein in the operation position, the at least one weighing unit is supported at three support locations.

6. The belt conveyor device according to claim 1 wherein the weighing device comprises three supports for engaging the conveyor device in an operation position.

7. The belt conveyor device according to claim 1 wherein the conveyor device further comprises:
a sliding shoe for deviating the conveyor belt; and
a foldable nose bar to enable moving the at least one housing into and out of the at least one slot.

8. The belt conveyor according to claim 1 wherein the conveyor device further comprises interfaces for power and data transfer which are mutually connectable to a control device.

9. The belt conveyor according to claim 1 wherein the weighing device comprises at least one roller.

10. The belt conveyor according to claim 1 wherein the weighing device comprises a weighing matrix.

11. A conveyor device for a belt conveyor for a dough line, the belt conveyor including a weighing device, comprising:
a frame;
at least two rollers supported by the frame;
a conveyor belt arranged movable in a length direction of the belt around the at least two rollers; and
a slot provided in the frame, wherein the slot extends in a width direction of the conveyor belt and is arranged adjacent to an inwardly facing part of the conveyor belt, and wherein the slot slidably receives the weighing device.

12. The conveyor device according to claim 11 wherein the slot comprises a guidance for the weighing device, and a wheel of the weighing device engages the guidance when the weighing device is slidably placed in or removed from the slot.

13. The conveyor device according to claim 12 wherein the guidance comprises an interruption or recess, which is positioned such that the wheel of the weighing device is free from the guidance when the weighing device is in an operation position with respect to the slot.

14. The conveyor device according to claim 11 wherein the slot comprises a wheel to guide the weighing device, and the wheel of the slot engages a guidance of the weighing device when the slot slidably receives the weighing device.

15. The conveyor device according to claim 11, further comprising:
a sliding shoe for deviating the conveyor belt; and
a foldable nose bar to enable moving the at least one weighing unit into and out of the at least one slot.

16. The conveyor device according to claim 11, further comprising interfaces for power and data transfer which are mutually connectable to a control device.

17. A weighing device for a belt conveyor for a dough line, the belt conveyor including a conveyor device, comprising:
a housing fitting a slot provided in a fame of the conveyor device, wherein the housing is slidably movable into and removable from the slot;
at least one weighing unit carried by the housing, wherein the at least one weighing unit includes a weighing surface facing outwardly for weighing a weight exercised on the weighing surface;
a wheel for engaging a guidance provided in the slot while the housing is slidably placed in or removed from the slot; and
three supports for engaging the conveyor device in an operation position to weigh doughs.

* * * * *

UNITED STATES PATENT AND TRADEMARK OFFICE
CERTIFICATE OF CORRECTION

| | | |
|---|---|---|
| PATENT NO. | : 11,333,543 B2 | Page 1 of 1 |
| APPLICATION NO. | : 16/522222 | |
| DATED | : May 17, 2022 | |
| INVENTOR(S) | : Johannes Josephus Antonius Van Blokland | |

It is certified that error appears in the above-identified patent and that said Letters Patent is hereby corrected as shown below:

In the Claims

Column 8, Line 9: delete "fame" and insert --frame-- therefor.

Signed and Sealed this
Tenth Day of October, 2023

*Katherine Kelly Vidal*

Katherine Kelly Vidal
*Director of the United States Patent and Trademark Office*